(12) United States Patent
Yhr

(10) Patent No.: US 12,021,607 B2
(45) Date of Patent: Jun. 25, 2024

(54) CONNECTOR ASSEMBLY FOR HIGH-SPEED WIRELESS COMMUNICATION BETWEEN VEHICLES

(71) Applicant: VOLVO TRUCK CORPORATION, Gothenburg (SE)

(72) Inventor: Hamid Yhr, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 138 days.

(21) Appl. No.: 17/366,819

(22) Filed: Jul. 2, 2021

(65) Prior Publication Data

US 2022/0006516 A1 Jan. 6, 2022

Related U.S. Application Data

(63) Continuation of application No. PCT/IB2020/056276, filed on Jul. 2, 2020.

(51) Int. Cl.
| | |
|---|---|
| *H04B 7/24* | (2006.01) |
| *H01Q 1/52* | (2006.01) |
| *H04B 5/72* | (2024.01) |

(52) U.S. Cl.
CPC ............... *H04B 7/24* (2013.01); *H01Q 1/526* (2013.01); *H04B 5/72* (2024.01)

(58) Field of Classification Search
CPC ....................................................... H04B 7/24
See application file for complete search history.

(56) References Cited

U.S. PATENT DOCUMENTS

| 7,932,815 B2 | 4/2011 | Martinez et al. |
| 2005/0062590 A1 | 3/2005 | Lang et al. |

(Continued)

FOREIGN PATENT DOCUMENTS

| EP | 3572308 A1 | 11/2019 |
| GB | 2447731 A | 9/2008 |
| KR | 102055364 B1 | 12/2019 |

OTHER PUBLICATIONS

Europe Extended Search Report dated Oct. 12, 2021 in corresponding Europe Patent Application No. 21181377.9, 10 pages.

(Continued)

*Primary Examiner* — Hsinchun Liao
(74) *Attorney, Agent, or Firm* — Venable LLP; Jeffri A. Kaminski

(57) ABSTRACT

A wireless communication system (100) for communication between a truck (102) and a trailer (104), the system comprising:
  a connector assembly (106) coupled between the truck (102) and the trailer (104), the connector assembly comprising a connector assembly housing (108);
  a first wireless communication module (112) coupled to electronic circuitry (114) in the truck; and
  a second wireless communication module (120) coupled to electronic circuitry (122) in the trailer,
  wherein the first wireless communication module and the second wireless communication module are disposed within the connector assembly housing,
  wherein the connector assembly housing comprises electromagnetic shielding means arranged to reduce a transmission of electromagnetic radiation between the first and/or second wireless communication modules and an environment (138) outside the connector assembly housing, and
  wherein the first wireless communication module and the second wireless communication module are configured to establish a wireless communication link (134) therebetween.

14 Claims, 6 Drawing Sheets

(56) References Cited

U.S. PATENT DOCUMENTS

| | | |
|---|---|---|
| 2008/0303648 A1 | 12/2008 | Day |
| 2016/0023587 A1 | 1/2016 | Bean |
| 2019/0315170 A1 | 10/2019 | Williams |
| 2020/0358172 A1* | 11/2020 | Hill .................... H01Q 15/0053 |

OTHER PUBLICATIONS

International Search Report and Written Opinion dated Mar. 4, 2021 in corresponding International PCT Application No. PCT/IB2020/056276, 10 pages.

* cited by examiner

CONNECTOR ASSEMBLY FOR HIGH-SPEED WIRELESS COMMUNICATION BETWEEN VEHICLES

CROSS-REFERENCE TO RELATED APPLICATIONS

This application is a continuation of International Application No. PCT/IB2020/056276, filed Jul. 2, 2020, all of which is hereby incorporated by reference in its entirety.

TECHNICAL FIELD

The present disclosure relates to vehicles, particularly heavy-duty vehicles, and particularly means of communication between vehicles in a vehicle combination.

BACKGROUND

Many different kinds of vehicles are increasingly employing computing systems for various functions. For example, trucks and trailers may include cameras, radar, lidar, or other sensors to enable autonomous or semi-autonomous functionality. In addition, many vehicles can be mechanically connected to each other, such as a truck and a trailer for example, with many functions requiring communication between the different vehicles. As the number and complexity of vehicle features increases, there is a need for reliable and secure high-speed data communication between the different vehicles.

EP3572308 A1 discloses a connection for secure tractor-trailer communication. US2019/0315170 A1 discloses a trailer signal system.

Still, there is a need for improved systems for communication between vehicles.

SUMMARY

It is an object of the present disclosure to provide improved means of communication between vehicles.

The object is obtained at least in part by a wireless communication system for communication between a truck and a trailer. The system comprises a connector assembly coupled between the truck and the trailer. The connector assembly comprises a connector assembly housing, a first wireless communication module coupled to electronic circuitry in the truck, and a second wireless communication module coupled to electronic circuitry in the trailer. The first wireless communication module and the second wireless communication module are disposed within the connector assembly housing, which comprises electromagnetic shielding means arranged to reduce a transmission of electromagnetic radiation between the first and/or second wireless communication modules and an environment outside the connector assembly housing. The first wireless communication module and the second wireless communication module are configured to establish a wireless communication link therebetween.

If electromagnetic radiation from the outside environment reaches the wireless communication modules, this may interfere with the data transfer between the two modules. Conversely, electromagnetic radiation from the wireless communication modules may disturb the function of other electronic devices. An advantage of the connector assembly housing comprising an electromagnetic shielding means is that these problems can be reduced or even eliminated, as the amount of electromagnetic radiation transmitted from the inside of the connector assembly housing to the outside, or vice versa, is reduced. As a further advantage, this may enable the use of frequency bands that are otherwise reserved for other applications.

Also, since the first wireless communication module and the second wireless communication module are configured to establish a wireless communication link therebetween, a connection between, e.g., truck and trailer may be established before connector assembly parts mate to form the electromagnetic shielding. This means that, even though some interference may occur, a connection between non-coupled vehicle units may be formed. This connection may be useful during, e.g., a coupling operation. Once the connector assembly parts are mated, almost interference free communication ensues, and the transition from interference-prone to interference-free communication is seamless.

The connector assembly housing may be configured to fully enclose the first wireless communication module and the second wireless communication module, forming a mechanically sealed enclosure around the first and second wireless communication modules. Advantageously, the mechanically sealed enclosure formed by the connector assembly housing protects the wireless communication modules from e.g., dust, dirt, or precipitation that may be present in the environment. It may also be designed to withstand mechanical impacts, reducing the risk of damage to the wireless communication modules.

The electromagnetic shielding means may comprise an electrically conducting material, which will hinder the transmission of electromagnetic radiation. To minimize leakage of electromagnetic radiation, the conductive material should ideally enclose the wireless communication modules completely, or at least without leaving holes or gaps that are similar in size to the wavelength of the electromagnetic radiation. To achieve this, the electrically conducting material may be arranged to form an electrical contact between a first ground plane comprised in the first wireless communication module and a second ground plane comprised in the second wireless communication module. Advantageously, this provides good electromagnetic shielding.

According to aspects, the electromagnetic shielding means may comprise an electromagnetic band gap (EBG) structure. EBG structures are highly efficient at causing attenuation of electromagnetic radiation in a frequency band corresponding to the electromagnetic band gap of the EBG structure and are therefore good electromagnetic shielding materials. Advantageously, use of an EBG structure for electromagnetic shielding does not require electric contact to be maintained, unlike the case when an ordinary conducting material is used.

According to aspects, the EBG structure may be arranged to reduce transmission of electromagnetic radiation in a frequency band of operation of the first and second wireless communication modules. This may entail matching the electromagnetic band gap of the EBG structure to the frequency band of operation and has the advantage that the EBG structure will be an effective shielding means for electromagnetic radiation in the relevant frequency band.

The EBG structure may comprise a plurality of protruding elements arranged periodically or quasi-periodically on a substrate 620. Advantageously, this type of EBG structure is easy to manufacture.

According to aspects, a space surrounding the plurality of protruding elements may be at least partly filled with a dielectric material. The dielectric material, which may be a non-conducting polymer or resin, will hinder the accumulation of other materials such as dust, dirt, or water in the space between the protruding elements, which is an advantage as the accumulation of such materials may alter the properties of the EBG structure.

Optionally, a size of the protruding elements may be smaller than 10% of a wavelength in air of electromagnetic radiation in a frequency band of operation of the first and second wireless communication modules. Advantageously, this can result in a good match between the frequency band of operation and the electromagnetic band gap of the EBG structure, leading to the EBG being an efficient electromagnetic shielding means.

According to aspects, a distance between the first wireless communication module and the second wireless communication module may be less than 5 centimeters. A short distance between the wireless communication modules means that low output power can be used. Also, it allows for communication at very high carrier frequencies, where the bandwidth of the available frequency bands is large. This in turn leads to a higher rate of information transfer through the wireless communication system, which is an advantage.

The connector assembly may further comprise a first connector comprising the first wireless communication module and a second connector comprising the second wireless communication module. The first connector and the second connector are arranged to be mechanically coupled to each other to form the connector assembly. Advantageously, the first and second connectors enable a secure mechanical connection between respective parts of the connection assembly, thereby maintaining a desired distance between the first and second communication modules.

The object is also obtained at least in part by a truck and a trailer. The truck comprises a first connector, which comprises a first wireless communication module coupled to electronic circuitry in the truck. The first connector is arranged to connect to a second connector comprising a second wireless communication module, and the first and second connectors are arranged to be mechanically connected to form a connector assembly. The connector assembly comprises a connector assembly housing, which in turn comprises an electromagnetic shielding means arranged to reduce a transmission of electromagnetic radiation between the first and second wireless communication modules and an environment outside the connector assembly housing.

The trailer comprises a second connector which comprises a second wireless communication module, coupled to electronic circuitry in the trailer. The second connector is arranged to connect to a first connector which comprises a first wireless communication module. The first and second connectors are arranged to be mechanically connected to form a connector assembly, which comprises a connector assembly housing. The connector assembly housing comprises an electromagnetic shielding means arranged to reduce a transmission of electromagnetic radiation between the first and second wireless communication modules and an environment outside the connector assembly housing.

The object is also obtained at least in part by a method of wireless communication between a truck and a trailer. The truck comprises a first connector and the trailer comprises a second connector. The first and second connectors comprise respective first and second wireless communication modules, the first wireless communication module being connected to electronic circuitry in the truck and the second wireless communication module being connected to electronic circuitry in the trailer. The first and second connectors are arranged to be mechanically connected to form a connector assembly comprising a connector assembly housing. The connector assembly housing comprises an electromagnetic shielding means arranged to reduce a transmission of electromagnetic radiation between the first and second wireless communication modules and an environment outside the connector assembly housing. The method comprises connecting the first connector to the second connector, establishing a wireless communication link between the first wireless communication module and the second wireless communication module, and transferring data between the first wireless communication module and the second wireless communication module.

The above-mentioned object may furthermore, at least in part, be obtained by a wireless communication system for communication between a truck and a trailer. The wireless communication system includes a connector assembly coupled between the truck and the trailer, the connector assembly comprising a connector assembly housing. The wireless communication system further includes a first wireless communication module coupled to electronic circuitry in the truck. The wireless communication system further includes a second wireless communication module coupled to electronic circuitry in the trailer. The first wireless communication module and the second wireless communication module are disposed within the connector assembly housing. The first wireless communication module and the second wireless communication module are configured to establish a wireless communication link therebetween.

According to another embodiment, a connector assembly for communication between a truck and a trailer includes a first connector configured to be coupled to the truck, the first connector comprising a first wireless communication module configured to be coupled to electronic circuitry in the truck. The connector assembly further includes a second connector configured to be coupled to the trailer, the second connector comprising a second wireless communication module configured to be coupled to electronic circuitry in the trailer. The first connector and the second connector are configured to mechanically couple to each other to form the connector assembly. The first wireless communication module and the second wireless communication module are configured to establish, within the connection assembly, a wireless communication link therebetween.

According to another embodiment, a method of wireless communication between a truck and a trailer includes connecting a first connector of the truck to a second connector of the trailer to position a first wireless communication module of the first connector within a first distance of a second wireless communication module of the second connector. The first wireless communication module is coupled to electronic circuitry in the truck. The second wireless communication module coupled to electronic circuitry in the trailer. The method further includes establishing a wireless communication link between the first wireless communication module and the second wireless communication module. The method further includes transferring data at a first transfer speed between the first wireless communication module and the second wireless communication module.

Other devices, methods, and systems according to embodiments will be or become apparent to one with skill in the art upon review of the following drawings and detailed description. It is intended that all such additional surface compaction machines, methods, and control systems be included within this description and protected by the accompanying claims. Moreover, it is intended that all embodiments disclosed herein can be implemented separately or combined in any way and/or combination.

According to an aspect, a wireless communication system for communication between a truck and a trailer includes a connector assembly coupled between the truck and the trailer, the connector assembly comprising a connector assembly housing. The wireless communication system further includes a first wireless communication module coupled to electronic circuitry in the truck. The wireless communication system further includes a second wireless communication module coupled to electronic circuitry in the trailer. The first wireless communication module and the second wireless communication module are disposed within the connector assembly housing. The first wireless communication module and the second wireless communication module are configured to establish a wireless communication link therebetween.

According to another aspect, the connector assembly housing is configured to fully enclose the first wireless communication module and the second wireless communication module to isolate the first wireless communication module and the second wireless communication module from an environment outside the connector assembly housing.

According to another aspect, the connector assembly housing comprises electromagnetic shielding to electromagnetically isolate the first wireless communication module and the second wireless communication module from an environment outside the connector assembly housing.

According to another aspect, the first wireless communication module and the second wireless communication module are separated within the connector assembly by a distance less than 5 centimeters.

According to another aspect, the wireless communication link has a data transfer bandwidth of at least 5 Gigabits per second (Gb/s).

According to another aspect, the connector assembly further includes a first connector comprising the first wireless communication module, and a second connector comprising the second wireless communication module. The first connector and the second connector are configured to be selectively mechanically coupled to each other to form the connector assembly.

According to another aspect, the first connector and the second connector are further configured to be selectively mechanically decoupled from each other.

According to another aspect, the system further includes a first wired connection coupling the first wireless communication module to the electronic circuitry in the truck.

According to another aspect, the system further includes a second wired connection coupling the second wireless communication module to the electronic circuitry in the trailer.

According to another aspect, a connector assembly for communication between a truck and a trailer includes a first connector configured to be coupled to the truck, the first connector comprising a first wireless communication module configured to be coupled to electronic circuitry in the truck. The connector assembly further includes a second connector configured to be coupled to the trailer, the second connector comprising a second wireless communication module configured to be coupled to electronic circuitry in the trailer. The first connector and the second connector are configured to mechanically couple to each other to form the connector assembly. The first wireless communication module and the second wireless communication module are configured to establish, within the connection assembly, a wireless communication link therebetween.

According to another aspect, the connector assembly comprises a connector assembly housing. The first wireless communication module and the second wireless communication module are disposed within the connector assembly housing.

According to another aspect, the connector assembly housing is configured to fully enclose the first wireless communication module and the second wireless communication module to isolate the first wireless communication module and the second wireless communication module from an environment outside the connector assembly housing.

According to another aspect, the connector assembly housing comprises electromagnetic shielding to electromagnetically isolate the first wireless communication module and the second wireless communication module from an environment outside the connector assembly housing.

According to another aspect, the first wireless communication module and the second wireless communication module are separated within the connector assembly by a distance less than 5 centimeters.

According to another aspect, the wireless communication link has a data transfer bandwidth of at least 5 Gb/s. Other data transfer bandwidths are of course also possible. Here, data transfer bandwidth may refer to information transfer rate in terms of information bits per second, or a coded bit rate including channel code overhead and the like.

According to another aspect, the first connector and the second connector are further configured to be selectively mechanically decoupled from each other.

According to another aspect, a method of wireless communication between a truck and a trailer includes connecting a first connector of the truck to a second connector of the trailer to position a first wireless communication module of the first connector within a first distance of a second wireless communication module of the second connector. The first wireless communication module is coupled to electronic circuitry in the truck. The second wireless communication module coupled to electronic circuitry in the trailer. The method further includes establishing a wireless communication link between the first wireless communication module and the second wireless communication module. The method further includes transferring data at a first transfer speed between the first wireless communication module and the second wireless communication module.

According to another aspect, the first distance is less than 5 cm.

According to another aspect, the first transfer speed is greater than 5 Gb/s.

According to another aspect, connecting the first connector to the second connector further comprises forming a connector assembly comprising a connector assembly housing that fully encloses the first wireless communication module and the second wireless communication module, to isolate the first wireless communication module and the second wireless communication module from an environment outside the connector assembly housing.

The methods disclosed herein are associated with the same advantages as discussed above in connection to the different apparatuses. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
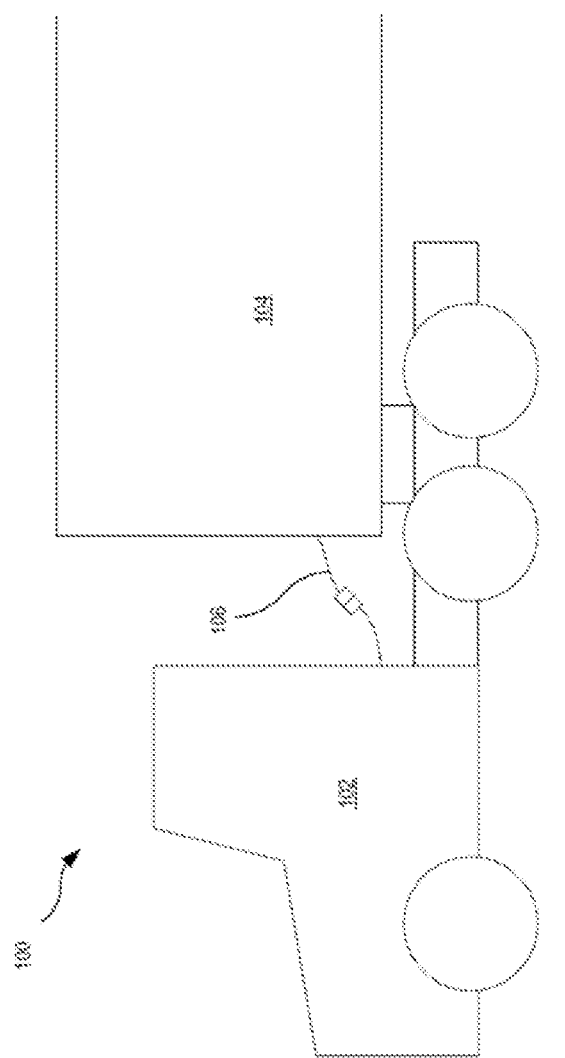
FIG. 1 illustrates a truck and a trailer with a wireless connection assembly.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 illustrates a wireless communication system 100 for a truck 102 and a trailer 104. In this example, a high-speed wireless connector assembly 106 is connected between the truck 102 and the trailer 104 to enable high-speed communication between components of the truck 102 and trailer 104. It should be understood, however, that any vehicles or combination of vehicles may employ features of the embodiments described herein. As used herein, a "vehicle" refers to a thing used for transporting goods and/or people, and may include motorized vehicles, such as trucks, automobiles, and/or motorized construction equipment, and non-motorized vehicles, such as trailers, carts, and/or dollies, for example.

Figure 2A:
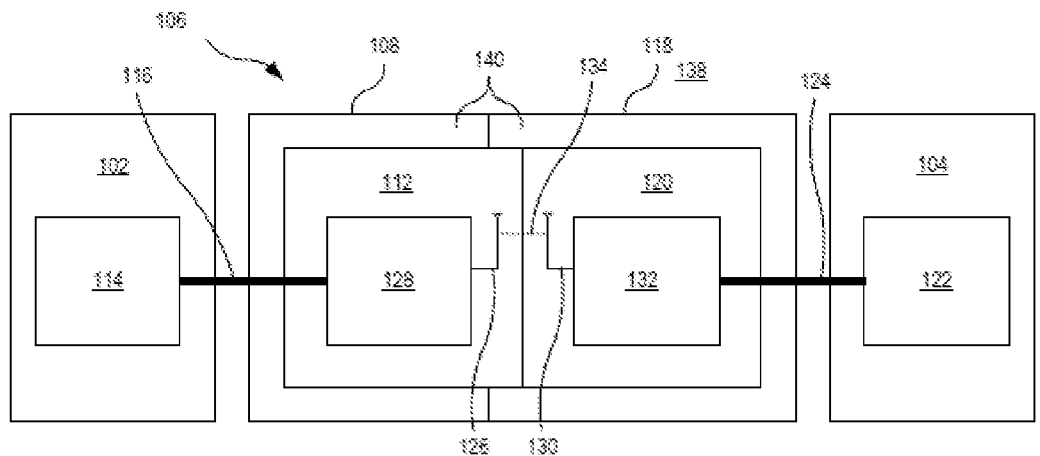
FIGS. 2A-B schematically illustrate a connection assembly in a connected and in a disconnected state.
Figure 2B:
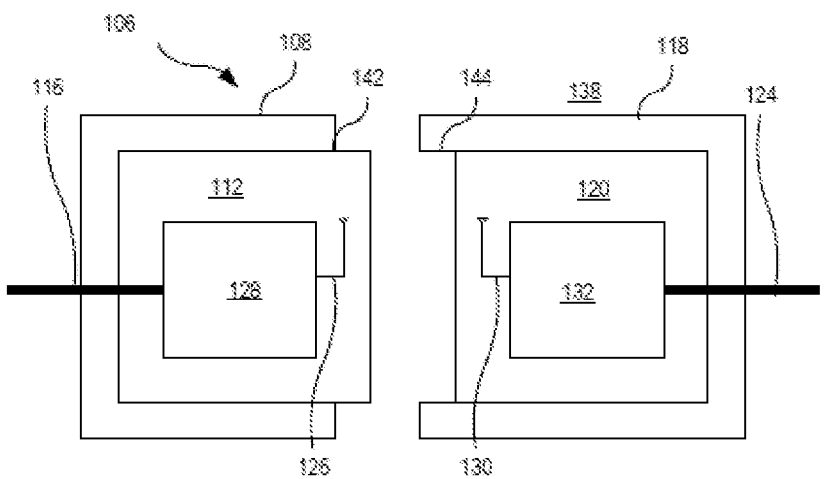

Referring now to FIGS. 2A and 2B, schematic diagram views of the connector assembly 106 of FIG. 1 are illustrated, according to some embodiments. FIG. 2A illustrates the connector assembly 106, including components thereof, in a connected state, and FIG. 2B illustrates the connector assembly 106 in a disconnected state. As noted above, the connector assembly 106 is connected between the truck 102 and the trailer 104. The connector assembly 106 includes a connector assembly housing 108 that houses a first wireless communication module 112 and a second wireless communication module 120. In this example, the first wireless communication module 112 is coupled to electronic circuitry 114 in the truck 102 via a first wired connection 116, and the second wireless communication module 120 is coupled to electronic circuitry 122 in the trailer 104 via a second wired connection 124. The electronic circuitry 114, 122 may be coupled to various components, such as computing devices, sensors, and/or cameras for example.

Forming a direct wired connection between the electronic circuitry 114, 122 in the different vehicles may have a number of disadvantages. One disadvantage is that it may be difficult to disconnect the wired connection to permit the vehicles to be separated from each other or connected to different vehicles. Many high-speed wired connection mechanisms are only capable of a limited number of connection/disconnection cycles without a decrease in the reliability of the high speed wired connection. In this example, instead of forming a direct wired connection, the connector assembly 106 positions the first wireless communication module 112 and a second wireless communication module 120 in close proximity to each other within the connector assembly housing 108. This permits the first wireless communication module 112 and the second wireless communication module 120 to establish a high-speed wireless communication link 134 therebetween without the performance degradation that may be exhibited by removable high speed wired connections.

In this embodiment, the first wireless communication module 112 includes a first transceiver 128 connected to a first antenna 126, and the second wireless communication module 120 includes a second transceiver 132 connected to a second antenna 130, but it should be understood that different components may be used, such as dedicated transmitters, receivers, and/or multiple antennas, for example.

In this embodiment, the first antenna 126 of the first wireless communication module 112 and the second antenna 130 of the second wireless communication module 120 are separated within the connector assembly 106 by a distance of less than 5 centimeters, but it should be understood that larger or smaller separation distances may be used, as desired. An advantage of positioning the first wireless communication module 112 and a second wireless communication module 120 in close proximity is that a high speed wireless communication link 134 can be established between the first wireless communication module 112 and the second wireless communication module 120 with a relatively small amount of power. For example, in this example, the first wireless communication module 112 and/or second wireless communication module 120 convert digital data to radio-frequency (RF) waves (e.g., 60 GHz or higher) and vice versa. The RF waves may further include modulation (e.g., quadrature amplitude modulation (QAM), to further increase a bit rate for the wireless communication link 134. For example, in this embodiment, the wireless communication link 134 has a data transfer bandwidth of at least 5 Gigabits per second (Gb/s). In some embodiments, the wireless communication link 134 is 10 Gb/s or more, but it should be understood that the connector assembly 106 may be configured to provide wireless communication links with higher or lower bandwidths, as desired. In some examples, the circuitry 114 in the truck 102 and/or the circuitry 122 in the trailer 104 may include a multiplexer/demultiplexer that combines and/or separates a plurality of individual data signals, from different sensors for example, into a combined high-bandwidth data signal for transmission between the truck 102 and the trailer 104.

Another advantage of this arrangement is that the transmission power for the first wireless communication module 112 and/or the second wireless communication module 120 can be kept relatively low. In addition to reducing power consumption, this also reduces the transmission range of the first wireless communication module 112 and/or the second wireless communication module 120, which in turn makes it more difficult for an unauthorized third party to access the wireless communication link 134.

In this embodiment the connector assembly housing 108 is further configured to fully enclose the first wireless communication module 112 and the second wireless communication module 120 to isolate the first wireless communication module 112 and the second wireless communication module 120 from an environment 138 outside the connector assembly housing 108, such as moisture and other physical hazards. In addition, the connector assembly housing 108 may further include electromagnetic shielding 140 to electromagnetically isolate the first wireless communication module 112 and the second wireless communication module 120 from the environment 138. The electromagnetic shielding 140 provides several benefits. For example, the shielding 140 prevents outside electromagnetic interference with the first wireless communication module 112 and the second wireless communication module 120, which allows the wireless communication link 134 to operate at higher connection speeds more reliably. In addition, the shielding 140 increases security for the wireless communication link 134 by reducing the transmission of electromagnetic signals between the connector assembly housing 108 and the environment 138 in both directions, and avoids regulatory issues that may apply to higher power wireless communication.

In this example, the connection assembly includes a first connector 108 that includes the first wireless communication module 112 and a second connector 118 that includes the second wireless communication module 120. As shown by FIG. 2B, the first connector 108 and the second connector 118 are configured to be selectively mechanically coupled to each other to form the connector assembly 106, and may also be selectively mechanically decoupled from each other, as desired. Because the first wireless communication module 112 and the second wireless communication module 120 do not form a direct wired connection, the number of connection/disconnection cycles for the first connector 108 and the second connector 118 are significantly increased. In this example, the first connector 108 forms a male connection interface 142 and the second connector 118 forms a female connection interface 144, but it should be understood that any number of different connection arrangements and mechanisms may be used, as desired.

In this embodiment, the truck 102 and the trailer 104 are able to move with respect to each other while coupled to each other without disconnecting the connector assembly 106. For example, in the example of FIG. 1, the connector assembly 106 forms a dedicated mechanical tether between the truck 102 and the trailer 104, with a suitable locking mechanism to maintain the connector assembly 106 and wireless communication link 134.

Figure 3A:
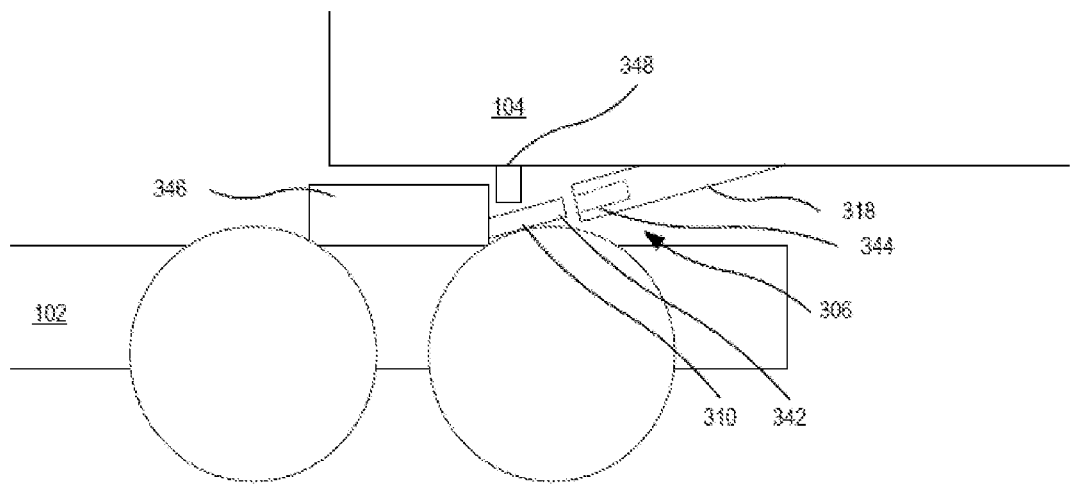
FIGS. 3A-B are views of a mechanical connection assembly in a connected and in a disconnected state.
Figure 3B:
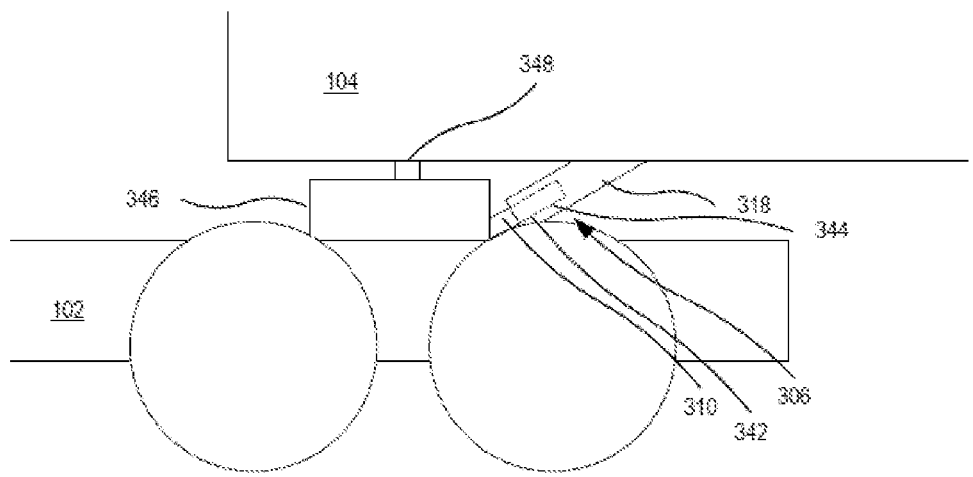

In another example, a mechanical coupling operation of the truck 102 and the trailer 104 may form a suitable connector assembly as part of the coupling operation. In this regard, FIGS. 3A and 3B are views of an alternative mechanical connector assembly 306 in a connected and disconnected state, according to some alternate embodiments. In this example, the truck 102 includes a fifth wheel 346 that couples to a kingpin 348 of the trailer 104 as part of a mechanical coupling operation. In this example, a first connector 310 coupled to the truck 102 near the fifth wheel 346 includes a male connection interface 342 positioned to be received by a female connection interface 344 of a second connector 318 coupled to the trailer 104 near the kingpin 348. In this manner, the mechanical coupling operation between the truck 102 and the trailer 104 forms a connector assembly housing 308, which houses some or all of the components of the connector assembly 106 of FIGS. 1-2B above, or similar components, to provide a wireless communication link between the truck 102 and the trailer 104.

Figure 4:
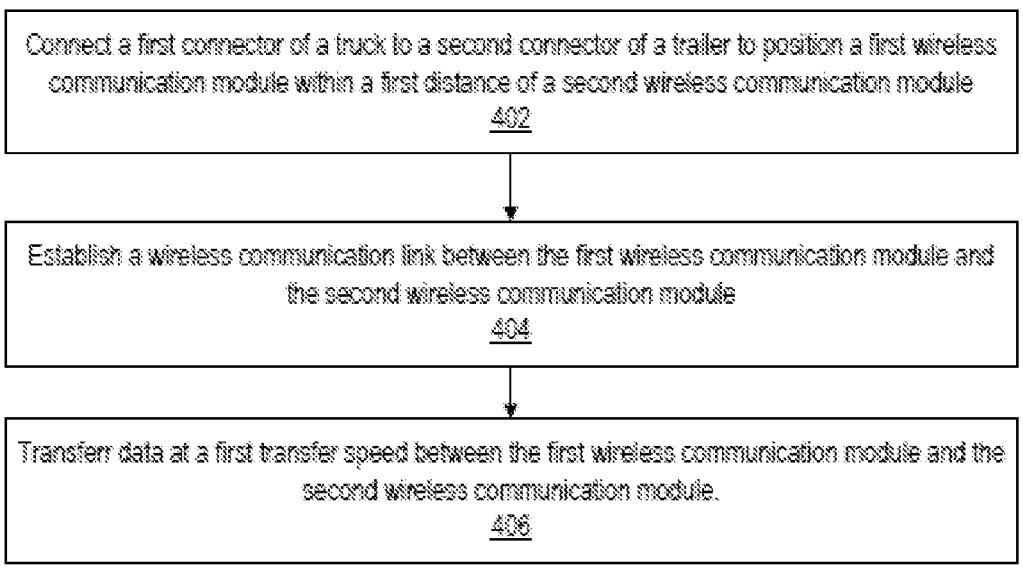
FIG. 4 is a flowchart illustrating methods.

FIG. 4 is a flowchart of operations 400 for a method of wireless communication between a truck and a trailer using a connection assembly, such as the connector assemblies 106, 306 of FIGS. 1-3B for example, according to some embodiments. The operations 400 include connecting a first connector 108 of the truck to a second connector 118 of the trailer, Block 402, to position a first wireless communication module within a suitable wireless communication distance of a second wireless communication module. The operations 400 further include establishing a wireless communication link between the first wireless communication module and the second wireless communication module, Block 404. The operations 400 further include transferring data between the first wireless communication module and the second wireless communication module, Block 406.

In this example, connecting the first connector to the second connector further includes forming a connector assembly housing that fully encloses the first wireless communication module and the second wireless communication module Block 408. As discussed above, fully enclosing the wireless communication modules may isolate the wireless communication modules from an environment outside the connector assembly housing.

Figure 5A:
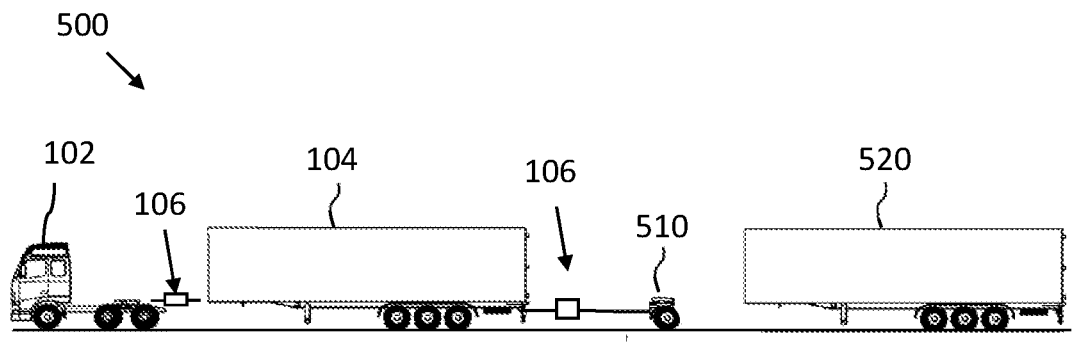
FIGS. 5A-B show example vehicle combinations, FIGS. 6A-B schematically illustrate an electromagnetic bandgap material, FIG. 7 schematically illustrates a control unit.
Figure 5B:
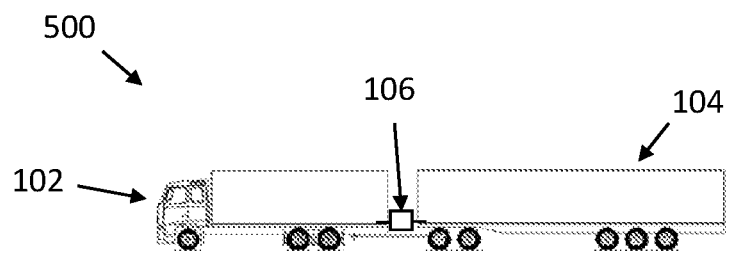

In the present disclosure, the term truck may be interpreted as denoting any tractor vehicle arranged to pull another vehicle unit to which it is connected via connection means such as a fifth wheel, kingpin, or drawbar. Likewise, a trailer may be any vehicle arranged to be pulled by such a tractor vehicle. For example, FIG. 5A shows a vehicle combination 500 comprising a tractor unit 102 and a first semitrailer 104, i.e., a trailer without a front axle, with a connector assembly 106 according to the present disclosure arranged between the vehicles. FIG. 5B shows a vehicle combination 500 comprising a truck 102 connected to a trailer with a front axle 104, also with a connector assembly 106 arranged between the vehicles.

The vehicle combination in FIG. 5A further comprises a dolly vehicle 510 arranged to be connected to the first semitrailer 104 as well as to a second semitrailer 510. A wireless communication system according to the present disclosure can be used also for communication between the first semitrailer 104 and the dolly vehicle 510, and/or between the dolly vehicle 510 and the second semitrailer 520. As an alternative, each vehicle in the vehicle combination may communicate with the vehicles immediately in front of and behind it through a wireless communication system 100 as herein described. Thus, a dolly vehicle 510 is herein seen as a form of trailer vehicle.

During operation of the vehicles, the wireless communication system 100 is expected to be exposed to harsh environmental conditions such as high and low temperatures, precipitation such as rain or snow, and dust and dirt from the road, among other things. It may also be positioned adjacent to other electronic systems that produce and/or are sensitive to electromagnetic fields, which may result either in the wireless communication system 100 being affected by other electronic systems or other electronic systems being affected by the wireless communication system 100. It is thus important that the wireless communication system 100 be adequately shielded both mechanically and electromagnetically.

In addition, verifying the robustness to interference of a wireless communication system for heavy-duty vehicles is challenging due to the large number of scenarios and conditions under which the system must operate. Using interference mitigation methods incorporated into the signal processing methods of the system also increases the complexity of the system. Removing the interference by reducing the amount of electromagnetic radiation able to cause interference, as in the present disclosure, presents a simpler solution.

To this end, and with reference to FIGS. 1, 2A, and 2B, there is disclosed a wireless communication system 100 for communication between a truck 102 and a trailer 104. The system comprises a connector assembly 106 coupled between the truck 102 and the trailer 104. The connector assembly comprises a connector assembly housing 108, a first wireless communication module 112 coupled to electronic circuitry 114 in the truck, and a second wireless communication module 120 coupled to electronic circuitry 122 in the trailer. The first wireless communication module and the second wireless communication module are disposed within the connector assembly housing, and the connector assembly housing comprises electromagnetic shielding means arranged to reduce a transmission of electromagnetic radiation between the first and/or second wireless communication modules and an environment 138 outside the connector assembly housing. The first wireless communication module and the second wireless communication module are configured to establish a wireless communication link 134 therebetween.

The electromagnetic shielding means is arranged to reduce a transmission of electromagnetic radiation between the wireless communication modules on the inside of the connector assembly housing and the environment 138 outside the connector assembly housing. This substantially reduces the risk of the wireless communication system 100 being affected by interference from outside sources of electromagnetic radiation, as well as the risk of other devices mounted in proximity to the wireless communication system 100 being affected by the wireless communication system.

In addition, if the wireless communication system 100 is isolated, or at least heavily shielded, from the environment 138 this may affect which frequency bands can be used by the system, and possibly also the allowed transmit powers. If the system does not interact with the outside environment, it may be permitted for the system to use carrier frequency bands that are otherwise licensed or dedicated to other specific applications.

According to aspects, a distance between the first wireless communication module 112 and the second wireless communication module 120 may be less than 5 centimeters. This short distance allows for communication at very high carrier frequencies, for example between 120 and 300 GHz or above. An advantage of using very high carrier frequencies is that the bandwidth of the available frequency bands is large, which in turn leads to a higher rate of information transfer through the wireless communication system.

The connector assembly may also comprise a first connector 108 comprising the first wireless communication module, and a second connector 118 comprising the second wireless communication module. The first connector and the second connector are arranged to be mechanically coupled to each other to form the connector assembly 106.

In order to mechanically protect the wireless communication modules from the surrounding environment, the connector assembly housing 108 may be configured to fully enclose the first wireless communication module 112 and the second wireless communication module 120. That is, the connector assembly housing 108 may form a mechanically sealed enclosure around the first and second wireless communication modules 112, 120.

Here, the term mechanically sealed should be interpreted to mean that the connector assembly housing 108 is designed to reduce the likelihood of objects from the environment, such as grains of sand, dust particles or water droplets, entering the connector assembly 106. As an example, FIGS. 2 A and B show the first connector 108 as forming a male connection interface or plug and the second connector 118 as forming a corresponding socket or a female connection interface. This would serve as a mechanical seal even though it is not hermetically sealed.

As an alternative, the connection interfaces may comprise screw treads arranged so that the connection interfaces can be screwed together in order to keep the connectors firmly connected. As another alternative, the connectors may be bayonet connectors.

The connector assembly housing may also be arranged to be resistant to mechanical impacts. This resistance may include the connector assembly housing being resistant to breaking due to mechanical impact as well as the connectors being arranged to tolerate mechanical impact without disconnecting. Optionally, the connector assembly housing may comprise a rigid or shock resistant layer, or a padded layer. Preferably, the connector assembly housing should be resistant to deformation by mechanical impacts.

An electromagnetic shielding means can block, absorb, and/or attenuate electromagnetic radiation. The electromagnetic shielding means may comprise an electrically conducting material, such as a metal foil or plate, a conductive foam, or a conductive mesh. An electrically conducting material is herein understood to be a material with an electrical conductivity similar to that of a metal or a semiconductor, or alternatively a material with an electrical conductivity above $100 \ (\Omega m)^{-1}$. A conductive foam may according to one example be a metal foam. According to another example it may comprise smaller particles of a conducting material such as a metal or carbon black dispersed in a carrier material such as a polymer or resin.

The choice of an electrically conducting material may be made in dependence of a frequency band of operation of the first and second wireless communication modules 112, 120. Components of the first and second wireless communication modules 112, 120, such as for example the transceiver 128, 132 and the antennas 126, 130, will be arranged to transmit and receive electromagnetic radiation in one or more frequency bands, a frequency band being an interval of frequencies between a minimum frequency and a maximum frequency. A frequency band may also be defined through a center frequency that is in the center of the frequency band along with the width of the frequency band. The one or more frequency bands in which the first and second wireless communication modules 112, 120 are arranged to transmit and receive electromagnetic radiation will herein be referred to as the frequency bands of operation of the wireless communication modules, or as the carrier frequency band.

In particular, if the electrically conducting material chosen for the electromagnetic shielding means is a mesh or any other structure comprising holes, the hole size may be selected so that it is much smaller than a corresponding wavelength in air of electromagnetic radiation in a frequency band of operation of the first and second wireless communication modules 112, 120. The hole size may for example be 10% or less of the wavelength.

To prevent leakage of electromagnetic radiation into or out of the connector assembly housing 108, it is advantageous to have the electrically conductive material completely enclose the first and second wireless communication modules 112, 120, or at least not leaving any gaps of a size similar to or larger than the wavelength in air of the frequency band of operation. This may be particularly challenging if the wavelength is short, e.g., a few millimeters, as a hole or gap of a few millimeters could form e.g., due to a mechanical impact that deforms the connector assembly housing or due to the connectors 108, 118 being incorrectly connected.

Therefore, the electrically conducting material may be arranged to form an electrical contact between a first ground plane comprised in the first wireless communication module 112 and a second ground plane comprised in the second wireless communication module 120.

Here, the ground planes are taken to be electrically conducting planes or objects large enough to serve as a zero-voltage reference level. Thus, by arranging an electromagnetic shielding means comprising a conductive material to form an electrical contact between the two ground planes, the first and second wireless communication modules are completely enclosed, reducing the risk of leakage of electromagnetic waves.

One particularly effective type of electromagnetic shielding means is an electromagnetic band gap, EBG, structure. EBG structures are a type of metamaterial, i.e., a material that is formed from at least two different component materials arranged in a particular manner. In an EBG structure, electromagnetic waves in a certain frequency band are strongly attenuated and the propagation through the structure is reduced for frequencies in this frequency band. This frequency band is the electromagnetic band gap or stop band of the EBG structure. EBG structures may also be referred to as photonic band gap or PBG structures.

An EBG structure is generally a periodic or quasi-periodic arrangement of elements with selected electromagnetic properties. Here, a periodic arrangement refers to an arrangement where a basic building block is repeated at regular intervals in one, two or three dimensions, while quasiperiodic arrangement refers to an arrangement where the building blocks are arranged to have some local structure but no long-range order. Alternatively, an EBG structure may be an arrangement of elements in a pattern characterized by translational symmetry, rotational symmetry, or glide symmetry.

Figure 6A:
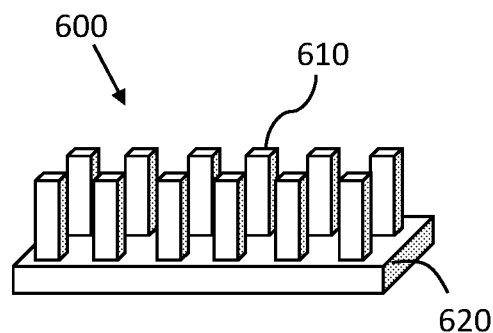
Figure 6B:
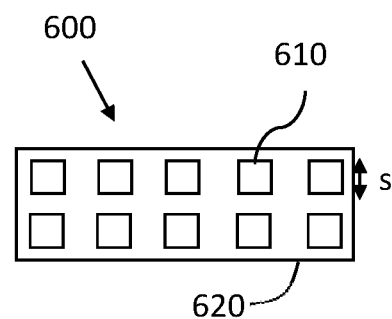

The selected electromagnetic properties of the elements depend on the intended use of the EBG structure. According to one example, the elements may comprise dielectric materials and be surrounded by a different dielectric material with a different dielectric constant. According to another example, the elements may comprise a conducting material such as a metal or a conducting polymer and may be surrounded by a dielectric such as a non-conducting polymer or resin, or air. An example EBG structure 600 is shown in FIGS. 6A and B, comprising elements 610 arranged in a pattern that is periodic in two dimensions. In this case, the elements have the shape of rectangular cuboids, but they could also for example be cylindrical, conical, or mushroom-shaped.

As an alternative, an EBG material could also comprise a block of a conducting material such as a metal or conducting polymer, with holes arranged in a pattern that is periodic or quasi-periodic in one, two or three dimensions. The holes may be filled with air, or with a solid dielectric such as a non-conducting polymer or resin.

The electromagnetic shielding means comprised in the connector assembly housing may thus comprise an electromagnetic band gap, EBG, structure 600. The EBG structure 600 may as an example comprise a plurality of protruding elements 610 arranged periodically or quasi-periodically on a substrate 620.

As previously mentioned, the protruding elements are to be surrounded by a dielectric, i.e., a material that is a poor electric conductor. The properties of this material, such as the dielectric constant, can affect the function of the EBG structure. If air is used as the dielectric material, it is important to ensure that no other material enters the EBG structure and occupies the volume between the protruding elements, as this may impair the electromagnetic shielding properties of the EBG structure.

In the present application, the wireless communication system 100 may be exposed to environmental factors such as dirt and dust, water, road salt, etc. It may therefore be an advantage to construct the EBG structure so that a space surrounding the plurality of protruding elements 610 is at least partly filled with a solid dielectric material, or preferably completely filled with a solid dielectric material, such as a non-conducting polymer or resin. This can mitigate the problem of introduction and accumulation of other materials such as dust, dirt, or water within the EBG structure.

An EBG structure causes attenuation of electromagnetic radiation at frequencies that fall in the band gap of the material. In the present application, this band gap may advantageously be matched to at least one frequency band of operation of the first and second wireless communication modules 112, 120, i.e., the EBG structure 600 may be arranged to reduce transmission of electromagnetic radiation in a frequency band of operation of the first 112 and second 120 wireless communication modules.

The band gap of an EBG structure is determined among other things by a size of the protruding elements 610, particularly a size in the direction or directions in which the EBG structure is periodic. In an EBG structure such as the one shown in FIGS. 6A and B this size would be the length s of a side the rectangular cuboids in the EBG plane. For a cylindrical protruding element, it may instead be a radius or diameter of the cylinder.

Thus, to match the band gap of the EBG structure to a frequency band of operation of the first and second wireless communication modules 112, 120, a size of the protruding elements 610 may be smaller than 10% of a wavelength in air of electromagnetic radiation in a frequency band of operation of the first 112 and second 120 wireless communication modules.

Again, with reference to FIGS. 1, 2A, and 2B, there is also herein disclosed a truck 102 comprising a first connector 108. The first connector comprises a first wireless communication module 112 coupled to electronic circuitry 114 in the truck and is arranged to connect to a second connector 118 comprising a second wireless communication module 120. The first and second connectors are arranged to be mechanically connected to form a connector assembly 106 comprising a connector assembly housing 108, where the connector assembly housing comprises an electromagnetic shielding means arranged to reduce a transmission of electromagnetic radiation between the first and second wireless communication modules 112, 120 and an environment 138 outside the connector assembly housing 108.

Furthermore, there is disclosed a trailer 104 comprising a second connector 118. The second connector comprises a second wireless communication module 120 coupled to electronic circuitry 122 in the trailer and is arranged to connect to a first connector 108 comprising a first wireless communication module 112. The first and second connectors are arranged to be mechanically connected to form a connector assembly 106 comprising a connector assembly housing 108. The connector assembly housing comprises an electromagnetic shielding means arranged to reduce a transmission of electromagnetic radiation between the first and second wireless communication modules 112, 120 and an environment 138 outside the connector assembly housing 108.

FIG. 4 illustrates a method of wireless communication between a truck 102 and a trailer 104. The truck 102 comprises a first connector 108 and the trailer 104 comprises a second connector 118. The first and second connectors 108, 118 comprise respective first 112 and second 120 wireless communication modules, where the first wireless communication module 112 is connected to electronic circuitry 114 in the truck 102 and the second wireless communication module 120 is connected to electronic circuitry 122 in the trailer. The first and second connectors are arranged to be mechanically connected to form a connector assembly 106 comprising a connector assembly housing 108. The connector assembly housing comprises an electromagnetic shielding means arranged to reduce a transmission of electromagnetic radiation between the first and second wireless communication modules 112, 120 and an environment 138 outside the connector assembly housing 108.

The method comprises connecting 402 the first connector 108 to the second connector 118, establishing 404 a wireless communication link 134 between the first wireless communication module 112 and the second wireless communication module 120, and transferring 406 data between the first wireless communication module 112 and the second wireless communication module 120.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof.

Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

Figure 7:
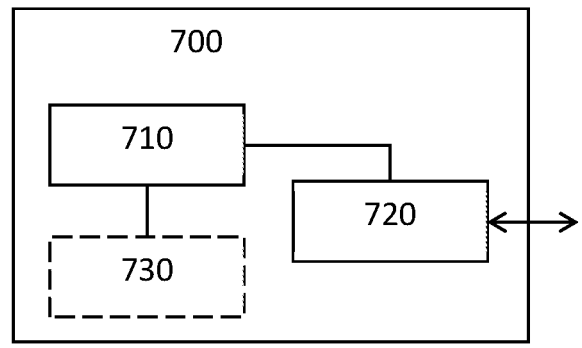

FIG. 7 schematically illustrates, in terms of a number of functional units, the components of a control unit 700 according to embodiments of the discussions herein. This control unit may be comprised in a vehicle 102, 104 or vehicle combination 500. Processing circuitry 710 is provided using any combination of one or more of a suitable central processing unit CPU, multiprocessor, microcontroller, digital signal processor DSP, etc., capable of executing software instructions stored in a computer program product, e.g., in the form of a storage medium 730. The processing circuitry 710 may further be provided as at least one application specific integrated circuit ASIC, or field programmable gate array FPGA.

Particularly, the processing circuitry 710 is configured to cause the control unit 700 to perform a set of operations, or steps, such as the methods discussed in connection to FIG. 4.

For example, the storage medium 730 may store the set of operations, and the processing circuitry 710 may be configured to retrieve the set of operations from the storage medium 730 to cause the control unit 700 to perform the set of operations. The set of operations may be provided as a set of executable instructions. Thus, the processing circuitry 710 is thereby arranged to execute methods as herein disclosed. In particular, there is disclosed a control unit 700 for controlling communication between a truck 102 and a tractor 104 via a wireless communication system 100, the control unit comprising processing circuitry 710, an interface 720 coupled to the processing circuitry 710, and a memory 730 coupled to the processing circuitry 710, wherein the memory comprises machine readable computer program instructions that, when executed by the processing circuitry, causes the control unit to perform the methods discussed above in connection to FIG. 4.

The storage medium 730 may also comprise persistent storage, which, for example, can be any single one or combination of magnetic memory, optical memory, solid state memory or even remotely mounted memory.

The control unit 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Figure 8:
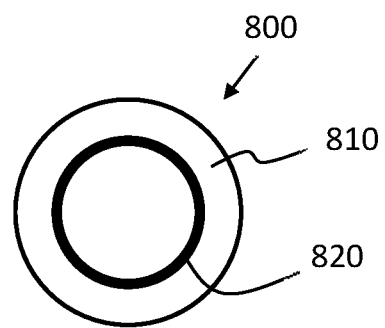
FIG. 8 shows an example computer program product.

FIG. 8 illustrates a computer readable medium 810 carrying a computer program comprising program code means 820 for performing the methods illustrated in FIG. 4, when said program product is run on a computer. The computer readable medium and the code means may together form a computer program product 800.

The invention claimed is:

1. A wireless communication system for communication between a truck and a trailer, the system comprising:
   a connector assembly coupled between the truck and the trailer, the connector assembly comprising a connector assembly housing, the connector assembly housing comprising a first wireless communication module coupled to electronic circuitry in the truck;
   and a second wireless communication module coupled to electronic circuitry in the trailer;
   wherein, in a disconnected state of the connector assembly, a first part of the connector assembly housing is arranged around the first wireless communication module and a second part of the connector assembly housing is arranged around the second wireless communication module,
   wherein, in a connected state of the connector assembly, the first and second wireless communication modules are fully enclosed by the respective first and second parts of the connector assembly housing such that a mechanically sealed enclosure is formed by the connector assembly housing around the first and second wireless communication modules, the mechanically sealed enclosure isolating the first and second wireless communication modules from an environment outside the connector assembly housing, and
   wherein the connector assembly housing is configured to establish a wireless communication link between the first and second wireless communication modules in the connected state.

2. The wireless communication system according to claim 1, wherein the connector assembly housing further comprises electromagnetic shielding means arranged to reduce a transmission of electromagnetic radiation between the first and/or second wireless communication modules and an environment outside the connector assembly housing.

3. The wireless communication system according to claim 2, wherein the electromagnetic shielding means comprise an electrically conducting material.

4. The wireless communication system according to claim 3, wherein the electrically conducting material is arranged to form an electrical contact between a first ground plane comprised in the first communication module and a second ground plane comprised in the second communication module.

5. The wireless communication system according to claim 2, wherein the electromagnetic shielding means comprise an electromagnetic band gap, EBG, structure.

6. The wireless communication system according to claim 5, wherein the EBG structure is arranged to reduce transmission of electromagnetic radiation in a frequency band of operation of the first and second wireless communication modules.

7. The wireless communication system according to claim 5, wherein the EBG structure comprises a plurality of protruding elements arranged periodically or quasi-periodically on a substrate.

8. The wireless communication system according to claim 7, wherein a space surrounding the plurality of protruding elements is at least partly filled with a dielectric material.

9. The wireless communication system according to claim 7, wherein a size of the protruding elements is smaller than 10% of a wavelength in air of electromagnetic radiation in a frequency band of operation of the first and second wireless communication modules.

10. The wireless communication system according to claim 1, wherein a distance between the first wireless communication module and the second wireless communication module in the connected state is less than 5 centimeters.

11. The wireless communication system according to claim 1, wherein the connector assembly further comprises: a first connector comprising the first wireless communication module; and a second connector comprising the second wireless communication module, wherein the first connector and the second connector are arranged to be mechanically coupled to each other to form the connector assembly.

12. A truck comprising a connector assembly having a connector assembly housing, the connector assembly housing comprising:
   a first connector, the first connector comprising a first wireless communication module coupled to electronic circuitry in the truck; and
   a second connector, the second connector comprising a second wireless communication module;
   wherein, in a disconnected state of the connector assembly, a first part of the connector assembly housing is arranged around the first wireless communication module and a second part of the connector assembly housing is arranged around the second wireless communication module,
   wherein, in a connected state of the connector assembly, the first and second wireless communication modules are fully enclosed by the respective first and second parts of the connector assembly housing such that a mechanically sealed enclosure is formed by the connector assembly housing around the first and second wireless communication modules, the mechanically sealed enclosure isolating the first and second wireless communication modules from an environment outside the connector assembly housing, and
   wherein the connector assembly is configured to establish a wireless communication link between the first and second wireless communication modules in the connected state.

13. A trailer comprising a second connector, the second connector comprising a second wireless communication module coupled to electronic circuitry in the trailer, the second connector being arranged to connect to a first connector comprising a first wireless communication module, the first and second connectors being arranged to form a connector assembly comprising a connector assembly housing,
   wherein, in a disconnected state of the connector assembly, a first part of the connector assembly housing is arranged around the first wireless communication module and a second part of the connector assembly housing is arranged around the second wireless communication module, wherein, in a connected state of the connector assembly, the first and second wireless communication modules are fully enclosed by the respective first and second parts of the connector assembly housing such that a mechanically sealed enclosure is formed by the connector assembly housing around the first and second wireless communication modules, the mechanically sealed enclosure isolating the first and second wireless communication modules from an environment outside the connector assembly housing, and wherein the connector assembly housing is configured to establish a wireless communication link between the first and second wireless communication modules in the connected state.

14. A method of wireless communication between a truck and a trailer, the truck comprising a first connector, the trailer comprising a second connector, the first and second connectors comprising respective first and second wireless communication modules, the first wireless communication module being connected to electronic circuitry in the truck, the second wireless communication module being connected to electronic circuitry in the trailer, the first and second connectors being arranged to form a connector assembly comprising a connector assembly housing, wherein, in a disconnected state of the connector assembly, a first part of the connector assembly housing is arranged around the first wireless communication module and a second part of the connector assembly housing is arranged around the second wireless communication module, wherein, in a connected state of the connector assembly, the first and second wireless communication modules are fully enclosed by the respective first and second parts of the connector assembly housing such that a mechanically sealed enclosure is formed by the connector assembly housing around the first and second wireless communication modules, the mechanically sealed enclosure isolating the first and second wireless communication modules from an environment outside the connector assembly housing, the method comprising:

connecting the first connector to the second connector such that the connector assembly transitions from the disconnected state to the connected state;

establishing a wireless communication link between the first wireless communication module and the second wireless communication module; and transferring data between the first wireless communication module and the second wireless communication module.

\* \* \* \* \*